US008121853B2

(12) United States Patent
Cates

(10) Patent No.: US 8,121,853 B2
(45) Date of Patent: Feb. 21, 2012

(54) LOYALTY MEASUREMENT

(76) Inventor: Thomas M. Cates, Acton, MA (US)

(\*) Notice: Subject to any disclaimer, the term of this patent is extended or adjusted under 35 U.S.C. 154(b) by 269 days.

(21) Appl. No.: 12/535,682

(22) Filed: Aug. 5, 2009

(65) Prior Publication Data

US 2010/0042426 A1  Feb. 18, 2010

Related U.S. Application Data

(60) Provisional application No. 61/088,405, filed on Aug. 13, 2008.

(51) Int. Cl.
*G06Q 10/00* (2006.01)
(52) U.S. Cl. ........................................................ 705/1.1
(58) Field of Classification Search ........................ None
See application file for complete search history.

(56) References Cited

U.S. PATENT DOCUMENTS

| | | | |
|---|---|---|---|
| 6,915,270 | B1 | 7/2005 | Young et al. |
| 2003/0009373 | A1* | 1/2003 | Ensing et al. ................... 705/10 |
| 2003/0130983 | A1* | 7/2003 | Rebane ............................... 707/1 |
| 2005/0091077 | A1* | 4/2005 | Reynolds ........................... 705/1 |
| 2005/0119931 | A1 | 6/2005 | Schall |
| 2006/0041548 | A1* | 2/2006 | Parsons et al. ..................... 707/5 |
| 2006/0100897 | A1 | 5/2006 | Halloran et al. |
| 2007/0156515 | A1 | 7/2007 | Hasselback et al. |
| 2007/0271111 | A1 | 11/2007 | Dubinsky |
| 2008/0021750 | A1 | 1/2008 | Masuyama et al. |
| 2008/0065471 | A1* | 3/2008 | Reynolds et al. ............... 705/10 |
| 2010/0191581 | A1* | 7/2010 | Furin et al. ...................... 705/10 |

FOREIGN PATENT DOCUMENTS

| | | |
|---|---|---|
| KR | 10-2008-38688 B1 | 6/2008 |
| KR | 10-0838688 B1 | 6/2008 |
| WO | 2010/019433 A2 | 2/2010 |
| WO | 2010/019433 A3 | 5/2010 |

OTHER PUBLICATIONS

Raven et al., "The McClelland/McBer Competency Models", Chapter 15, Competence in the Learning Society, New York, Peter Lang, 2001, 10 pages.
McClelland, David C., "How motives, skills, and values determine what people do," PsycNET—Display Record, American Phycological Association, American Psychologist. vol. 40, No. 7, Jul. 1985, pp. 812-815 (Only Abstract submitted).
Brookeside, "Creating Loyalty at the Source", Brookeside Ventures Inc., 2001-2009, 4 pages.

(Continued)

*Primary Examiner* — Jonathan Ouellette
(74) *Attorney, Agent, or Firm* — Robert Plotkin, P.C.

(57) ABSTRACT

A computer-implemented system measures loyalty of one partner to another partner in a relationship, such as the loyalty of a company's customer to the company. The first partner's loyalty is measured by obtaining information from the partner, such as through answers to survey questions, about the partner's perception of the climate of the relationship. A loyalty index function may be applied to scores associated with the answers to produce a single loyalty index representing the first partner's loyalty to the other partner. The system may recommend that the second partner change their practices to increase the first partner's loyalty index. For example, the system may recommend that the second partner improve practices related to "satisfier" dimensions of the relationship, and/or that the second partner improve practices which empirical data have demonstrated to correlate most strongly with increased loyalty.

21 Claims, 15 Drawing Sheets

OTHER PUBLICATIONS

Cates, Thomas M., "Welcome toThe Age of Great Business Relationships", How to Create Long-term, Mutually Beneficial Relationships With Your Most Important Customers & Business Partners, Brookeside, Presented by The Brookeside Group, Inc., Copyright 2004, 20 pages.

F. Reichheld, "The Ultimate Question: Driving Good Profits and True Growth," Chapters 2 and 4 (Boston: Harvard Business School Press, 2006).

G. Litwin and R. Stringer, "Motivation and Organizational Climate," Chapters 2-6 (Boston: Harvard University Press, 1968).

R. Stringer, "Leadership and Organizational Climate," Chapters, 1-7 and 11 (Upper Saddle River, NJ: Prentice-Hall, 2002).

K. Lerman and M. Austin, "What Companies Gain from Listening," Communispace Corporation, Watertown, MA, 2006.

F. Reichheld, "The Loyalty Effect," Chapters 1, 4, 5, 7, and 8 (Boston: Harvard Business School Press, 1996).

L. Weber, "Marketing to the Social Web—How Digital Customer Communities Build Your Business," Chapter 4 (New Jersey: John Wiley & Sons, Inc., 2007).

* cited by examiner

LOYALTY MEASUREMENT

CROSS-REFERENCE TO RELATED APPLICATIONS

This application claims priority from commonly-owned U.S. Provisional Patent Application Ser. No. 61/088,405, filed on Aug. 13, 2008, entitled "Loyalty Measurement," which is hereby incorporated by reference herein.

BACKGROUND

All businesses desire to increase the loyalty of their customers because it is well-recognized that increasing loyalty leads to increased profits. Most businesses, however, find increased customer loyalty to be an elusive goal. It is difficult to increase loyalty in a business or other relationship not only because it can be challenging to identify the concrete actions that need to be taken to increase such loyalty, but also because it can be difficult even to measure the current loyalty of a customer or other party to the relationship. Failure to obtain a concrete and objective measurement of current loyalty will almost certainly lead to an inability to identify those concrete actions which are likely to increase such loyalty most efficiently.

SUMMARY

A computer-implemented system measures loyalty of one partner to another partner in a relationship, such as the loyalty of a company's customer to the company. The first partner's loyalty is measured by obtaining information from the partner, such as through answers to survey questions, about the partner's perception of the climate of the relationship. A loyalty index function may be applied to scores associated with the answers to produce a single loyalty index representing the first partner's loyalty to the other partner. The system may recommend that the second partner change their practices to increase the first partner's loyalty index. For example, the system may recommend that the second partner improve practices related to "satisfier" dimensions of the relationship, and/or that the second partner improve practices which empirical data have demonstrated to correlate most strongly with increased loyalty.

Other features and advantages of various aspects and embodiments of the present invention will become apparent from the following description and from the claims.

DETAILED DESCRIPTION

Loyalty Climate Model

Embodiments of the present invention are directed to techniques for measuring the loyalty of one or more partners to a relationship based on the relationship's "climate." "Loyalty climate" is a scientifically-devised measure of loyalty, and a leading indicator of customer retention. Embodiments of the loyalty climate model disclosed herein may be used to characterize business relationships in terms of multiple dimensions of social interaction. In particular, the following description will use six such dimensions as an example set of dimensions which form the foundation of all business relationships. Empirical research demonstrates that these dimensions not only provide insight into the level of loyalty characterizing a relationship, but also its potential value. In particular, the loyalty climate model is able to explain and predict customer retention and profitability over a wide range of business contexts.

The basis for embodiments of the loyalty climate model disclosed herein is research which has demonstrated that the key to arousing or stimulating a person's motivation lies in the motivational atmosphere or climate that surrounds the person. We define "climate" as the sum of what people feel, what they expect to happen to them if they behave in a certain way, and the value they place on these expected outcomes. In a relationship, these expectations and perceptions of consequences are largely created by the nature of the interactions and conversations between the people in the relationship. For example, the climate of a company-customer relationship is influenced by the products sold by the company to the customer, the invoices sent by the company to the customer, visits made to the customer by the company's competitors, and newspaper articles that the customer reads about the company.

Climate, however, persists even after the interactions that created it have stopped. In a very real sense, climate is the feelings and expectations that are left over after partners to a relationship have interacted with each other. That is why the weary traveler remembers his feelings of being helped when he needed it by an airline staff member. Climate arouses motivation and determines the behavior of people in battle battalions, on athletic teams, within business organizations, in families, and in situations where buyers interact with sellers.

Figure 1:
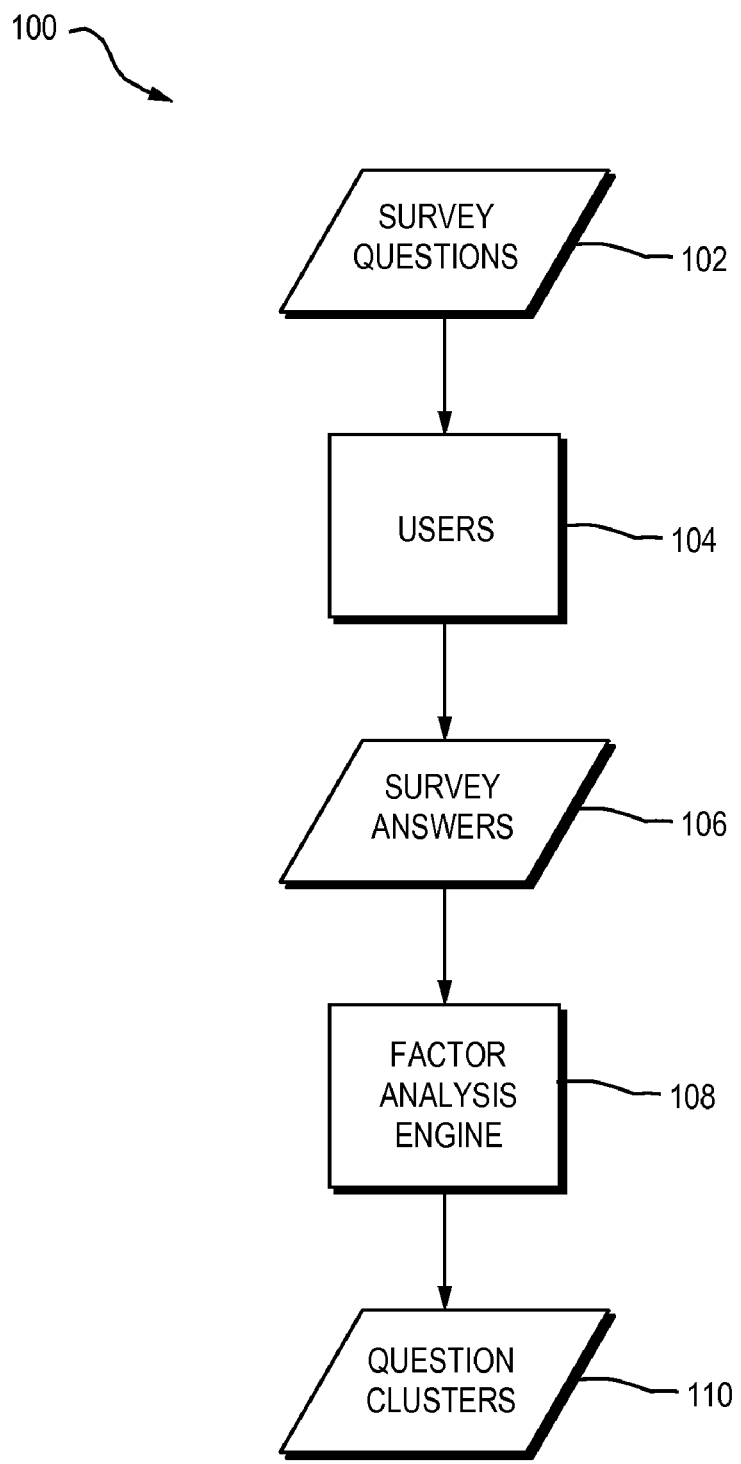
FIG. 1 is a dataflow diagram of a system that is used in one embodiment of the present invention to automatically identify dimensions of a relationship model.
Figure 2:
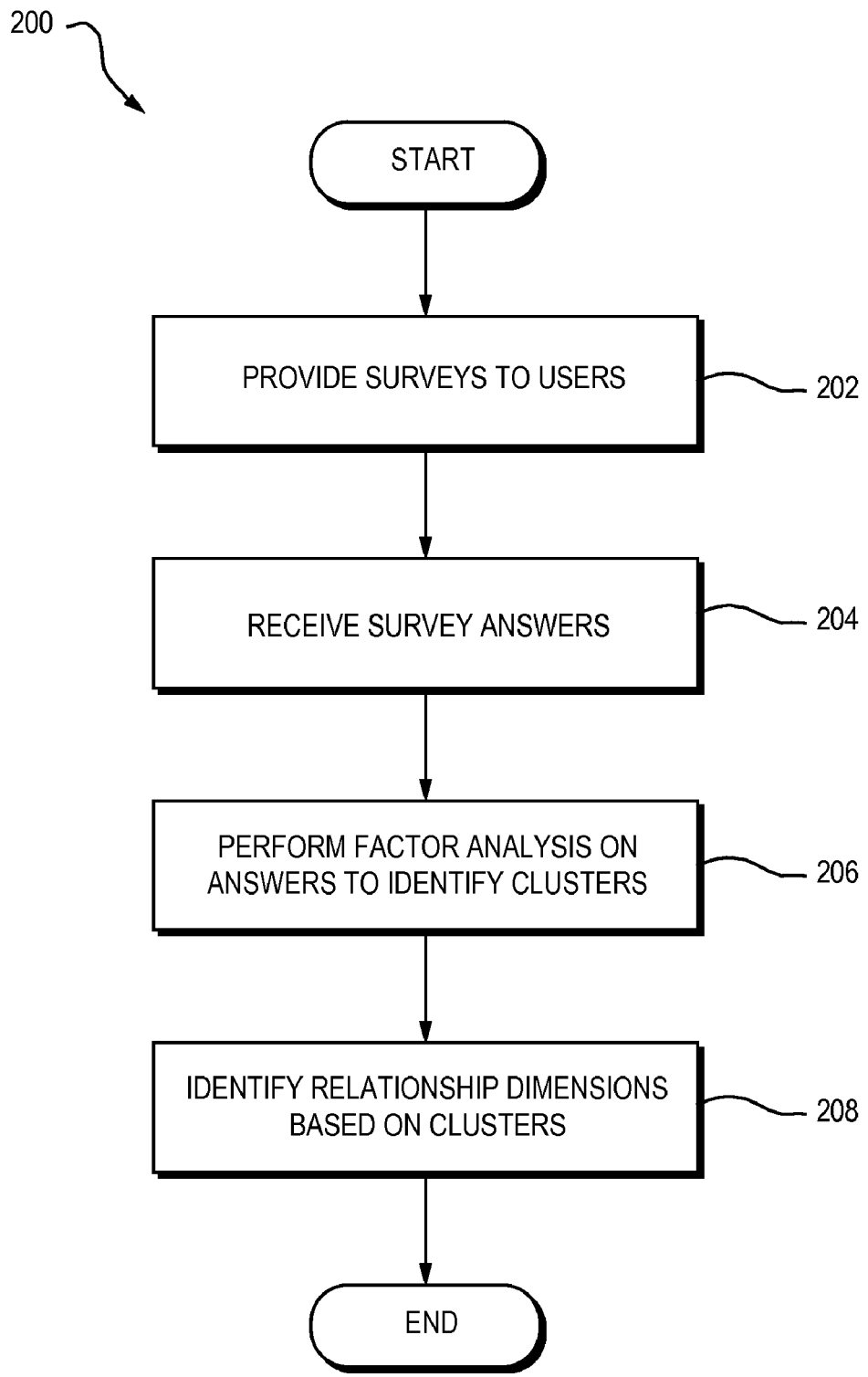
FIG. 2 is a flowchart of a method that is performed by the system of FIG. 1 according to one embodiment of the present invention.

It is useful, therefore, to have a model of the loyalty climate in order to measure it in particular relationships. Such a relationship model may include multiple dimensions for characterizing relationships. Referring to FIG. 1, a dataflow diagram is shown of a system 100 that is used in one embodiment of the present invention to automatically identify dimensions of a relationship model. Referring to FIG. 2, a flowchart is shown of a method 200 that is performed by the system 100 of FIG. 1 according to one embodiment of the present invention.

The method 200 may be performed to initialize parameter values in the relationship model. The relationship model, with its initialized parameter values, may then be applied across multiple relationships, and over time. The parameter values may, however, be updated periodically or at any appropriate time. Furthermore, a particular set of relationship model parameter values may be applied within a particular context, such as to relationships between a particular company and its customers. Different sets of parameter values may be initialized and applied to different contexts, such as different companies.

A survey 102, containing questions relating to the practices and perceptions of partners to a relationship (such as a business and its customers and/or business partners), is provided to a plurality of users 104 who are partners to the relationship (FIG. 2, step 202). In response to the surveys 102, the users 104 provide answers 106 to the survey questions 106 (step 204). Factor analysis 108 is performed on the survey results 106 to identify clusters 110 of questions (step 206). The resulting clusters 110 are used to identify dimensions for use in the relationship model (step 208). For example, when the survey 102 is subsequently provided to other users in the future, the identified clusters 110 of questions may be treated as soliciting information about different loyalty climate dimensions, as will be described in more detail below. Alternatively, for example, the clusters 110 may be analyzed manually and/or automatically, and topical similarities among the questions in each cluster may be identified. The identified similarities may then be used to develop other questions which are grouped together in topics corresponding to the clusters 110.

By applying the techniques illustrated in FIGS. 1 and 2, we have identified six relationship dimensions (described in more detail below) which describe significant aspects of business relationships and determine the level of loyalty they create. By regressing the dimension scores produced by these analyses against a score derived from the answers to the loyalty questions 306*a* (such as the sum of such answers), it has been demonstrated that the loyalty climate dimensions can both explain and predict customer retention and value.

As will be described in more detail below, the loyalty climate model may be implemented in an automated system, such as in software running on a general-purpose computer, to create a survey management and analysis tool for measuring and monitoring loyalty climate. Partners to a relationship may use such a system to fill out surveys or provide information about their perception of the relationship in other ways. The system may use the information provided to produce measurements of loyalty characterizing the business relationships, as well as the social dimensions of the relationship that explain that level of loyalty. The system may then use the loyalty measurements to manage the relationship, such as by recommending behaviors to one or both of the relationship partners which are expected to improve the climate of the relationship and thereby to increase the partners' loyalty to each other.

Loyalty Levels

In one embodiment of the present invention, a loyalty climate model is characterized by three metrics: a loyalty level, a loyalty index, and a plurality of (e.g., 6) relationship dimension scores. The loyalty climate model may be further characterized by additional metrics, such as a plurality of practices scores, scores derived from open-ended questions, and scores derived from demographic questions or other demographic data. Each of these metrics provides unique and actionable insight into business relationships. In one embodiment of the present invention, the loyalty level that characterizes a loyalty climate model may take any one of four values:

Level −1 describes an antagonistic relationship in which a partner (e.g., customer) may actively desire an alternative partner (e.g., vendor). Such relationships may be viewed by partners as necessary but not rewarding or fulfilling, and hence are highly vulnerable to defection. As a result, these types of relationships may be characterized as essentially antagonistic.

Level 1 describes a transactional relationship in which a partner is satisfied but also open to considering alternative relationships. The partner may not be actively seeking an alternative relationship, but nonetheless is at risk of defecting given the right opportunity; the partner views the relationship as merely a means to an end. Although partners in Level 1 relationships are not disloyal, they are also not loyal in any meaningful sense, in that there is no emotional connection established—only a transactional one. As a result, these types of relationships may be characterized as being transactional with respect to the degree of loyalty they inspire.

Level 2 relationships are generally positive but do not necessarily engender emotional responses in the participants. Individuals in these types of relationships are predisposed to continue the relationship because they view the relationship as adding value, but are not necessarily strongly motivated to do so. This is because their investment in the relationship is a purely logical one. A Level 2 partner is loyal as long as a more attractive opportunity does not present itself, not because of an investment in the relationship itself. Given the right opportunity, they will not be averse to defecting, since they have not established an emotional connection to their partner. Essentially, these partners' loyalty is proportional to their switching costs. As a result, although partners in Level 2 relationships are predisposed to continue the relationship, they are not invested in it to the point that they would be reticent to end it given the right alternative.

Level 3 relationships are those in which partners (e.g., customers) are genuinely loyal and view each other as strategic partners. Partners in Level 3 relationships are engaged in a long-term, mutually beneficial collaboration in which they feel emotionally invested. They are likely to give their partners the first- and last-look at new business, the benefit of the doubt when problems arise, and perhaps even to spend more money than they would on the competition in order to continue the relationship.

It is by creating this level of loyalty that companies achieve world-class customer retention levels are able to become industry leaders.

Loyalty Climate Dimensions

As mentioned above, a loyalty climate may be characterized not only by a loyalty level but also by a plurality of climate dimensions. In the discussion that follows, an example loyalty climate model will be described which uses six such dimensions: Integrity, Competency, Proactivity, Recognition, Savvy, and Chemistry.

These six dimensions may be organized hierarchically into two groups, reflecting the roles they play in relationships. More specifically, the dimensions of Integrity and Competency form the foundation of the hierarchy and are termed Satisfiers. Satisfiers are the basic pre-requisites that need to be satisfied in order to maintain any relationship; without them no relationship can produce any meaningful degree of loyalty. Although scoring high on these dimensions will satisfy a partner in a relationship, they are not necessarily motivating. Rather, they are the bare minimum requirements needed to develop the basis for a loyal relationship and alone generally result in transactional relationships.

"Integrity" refers to the degree to which an individual trusts their partner to provide them with accurate information and to be honest about the issues facing the relationship. Each partner in a relationship having integrity perceives the other partner as reliable and dependable. Any relationship that is not able to establish a mutual sense of integrity on both sides will fail to engender anything above a transactional level of loyalty.

"Competency" relates to the perception that one's partner is capable, knowledgeable, and experienced, and has the resources at their disposal to effectively deliver the promised goods or services. Without the sense that a partner is able to deliver the products and services expected of them in a competent manner, no meaningful business relationship can be developed.

Once you have proven that you and your company can satisfy your partner's basic needs, you have built the foundation for a good relationship. In order to move from good to great and transform a satisfied transactional customer into a predisposed or loyal partner you must focus on the other four dimensions, which are referred to herein as Motivators: Recognition, Proactivity, Savvy, and Chemistry.

Although scoring high on Integrity and Competency may be the proverbial "ticket to the game" when it comes to building lasting business relationships, high Integrity and Competency scores do little to motivate a client/partner to invest further in the relationship. In contrast, the dimensions of Recognition, Proactivity, Savvy, and Chemistry represent aspects of a relationship that tend to motivate partners to go the extra mile for each other in order to earn a mutual win.

"Recognition" refers to reinforcing a partner's sense that the relationship matters. Strong recognition helps to reinforce a customer's sense that they are not "just a number," and that their particular business and personal needs are not going unnoticed or unappreciated by the other partner in the relationship. Without recognition, business relationships are transactional and fail to instill the types of feelings and behaviors that produce loyal relationships.

Once a partner's basic needs are recognized, the dimension of "Proactivity" measures the extent to which partners feel that their needs are addressed spontaneously, as opposed to reactively. Proactivity involves going above and beyond what is expected or contracted and actively looking out for a partner's needs to ensure that they do not encounter any unpleasant surprises. Doing so helps to reinforce a partners' sense of recognition, trust, and competency, and therefore to motivate them to invest more in the relationship. Simple examples of ways to increase proactivity are remembering a customer's name and preferences, alerting the customer to changes well in advance, and contacting the customer to make sure that the customer has no ongoing unmet needs even if the customer has not voiced any concerns.

Proactivity itself, however, leaves unexplained why one partner's actions reflect an understanding of the other partner's world. This is what the "Savvy" dimension measures. Savvy is conveyed by demonstrating an understanding of the "bigger picture" in a partner's world-what their day is like, how their firm makes money, how their business operates, and how to help them achieve their goals. Whereas Competency requires mastering the language of your own business, Savvy requires mastering your client's language. Without savvy, a business partner can come to be perceived as a simple salesperson, as opposed to a valued advisor.

Lastly, "Chemistry" describes the degree to which partners' communication is efficient and effective. Individuals in relationships with high Chemistry scores enjoy each other's company, relate to each other in a similar manner, and generally see eye-to-eye on both business and personal matters.

Measuring Loyalty

The final metric that characterizes a loyalty climate model is a loyalty index. The loyalty index of a loyalty climate model may be derived from the model's loyalty level and from scores associated with each of the model's dimensions. The loyalty index may, for example, be represented as a single number, such as a number ranging from 1-100, representing the degree of loyalty of one relationship partner to another, where higher values represent greater loyalty. Examples of techniques that may be used to derive the loyalty index will now be described.

Figure 3:
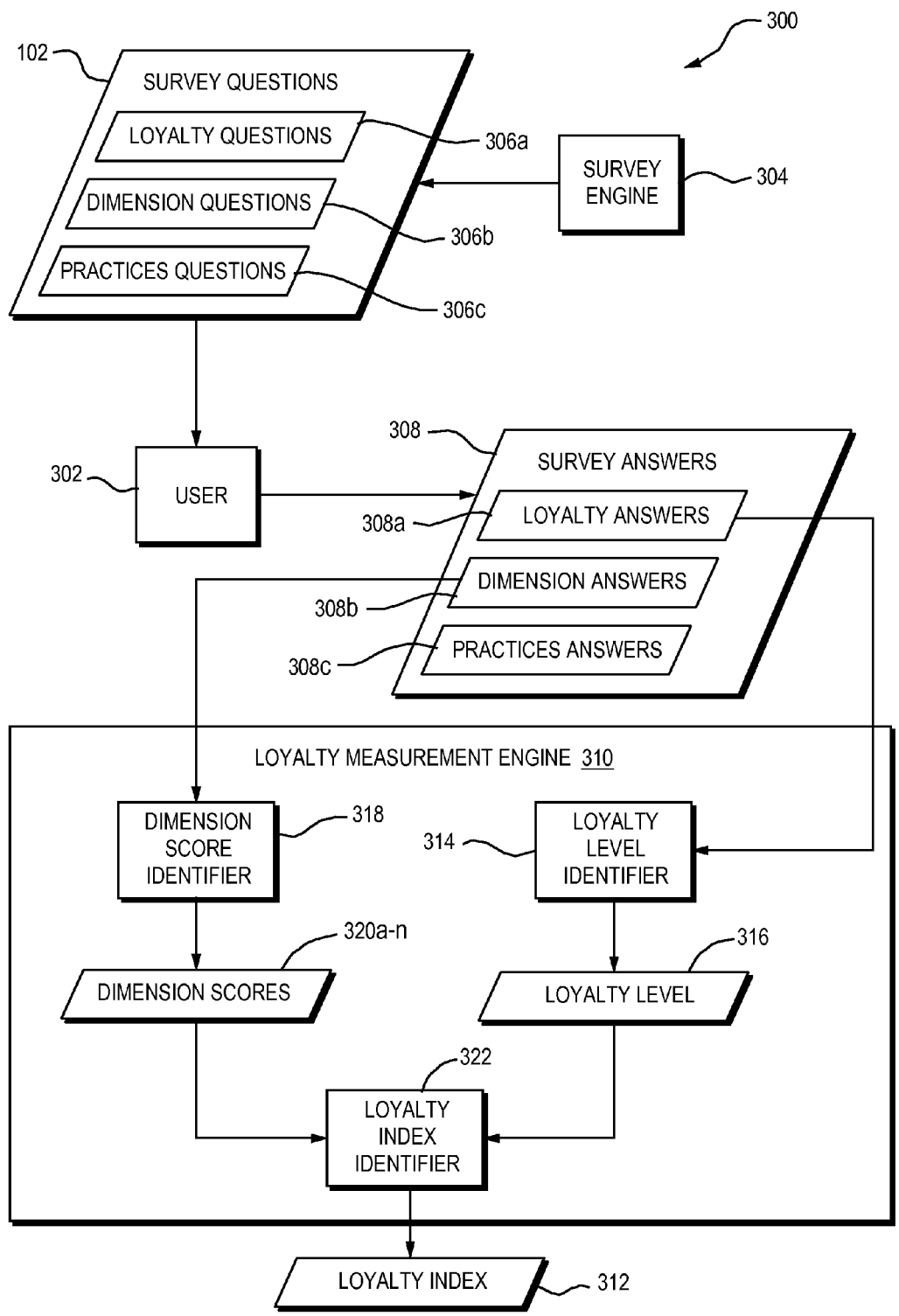
FIG. 3 is a dataflow diagram of a system that is used in one embodiment of the present invention to identify a loyalty index which characterizes the loyalty of one relationship partner to another relationship partner.
Figure 4:
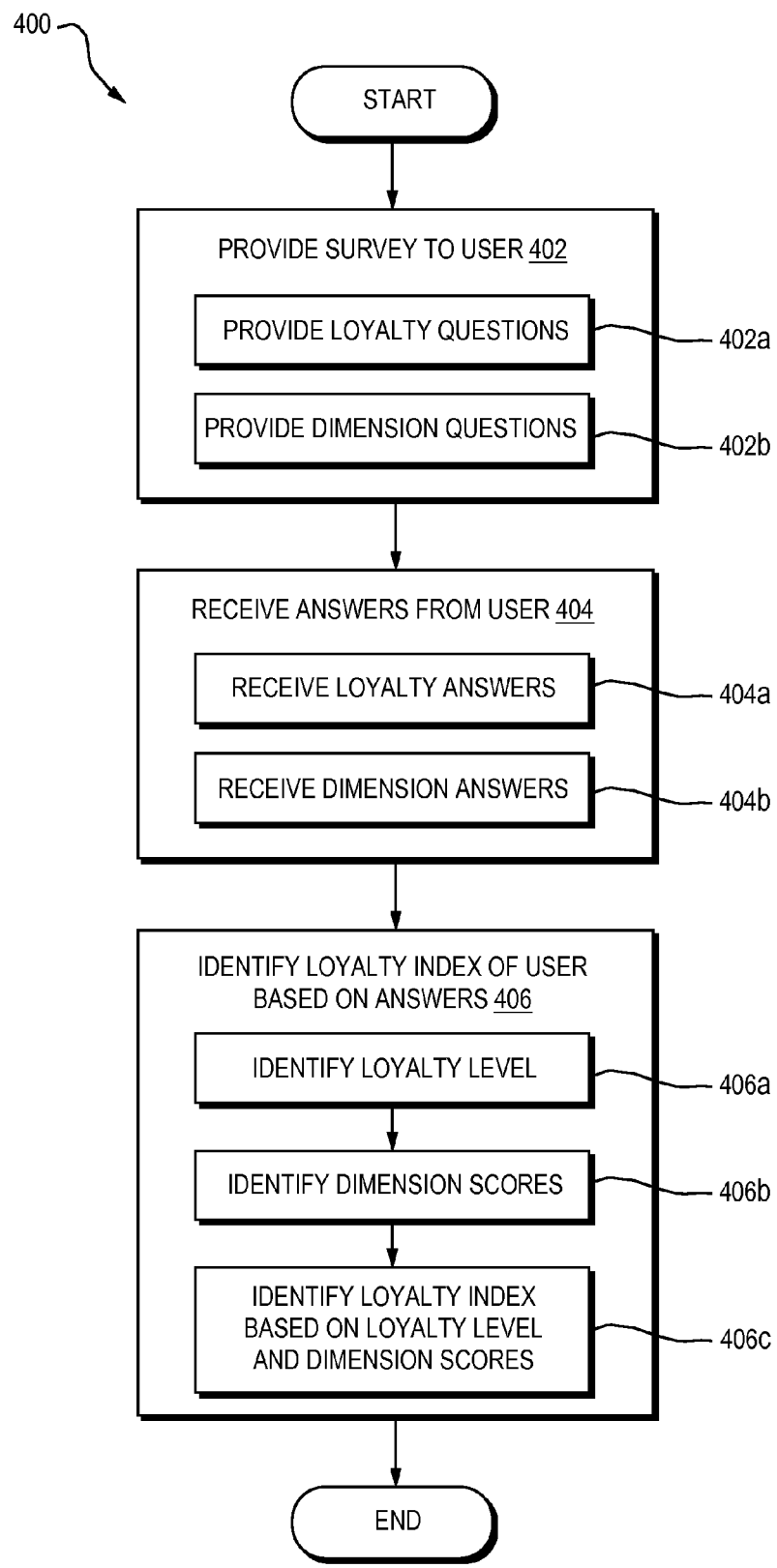
FIG. 4 is a flowchart of a method that is performed by the system 300 of in one embodiment of the present invention.

FIG. 3 illustrates a system 300 that is used in one embodiment of the present invention to identify a loyalty index which characterizes the loyalty of one relationship partner 302 to another relationship partner (not shown). FIG. 4 is a flowchart of a method 400 that is performed by the system 300 of FIG. 3 in one embodiment of the present invention.

A survey engine 304 provides a survey 306 to the user 302 (FIG. 4, step 402). The survey 306 may include questions 306a which solicit information about the loyalty of the user 302 to the other partner in the relationship, questions 306b which solicit information about each of the dimensions of in the loyalty climate model, and questions 306c about the practices of the other partner in the relationship. The user 302 provides answers 308 to the survey 306 to the survey engine 304 (step 404).

For example, if there are n loyalty climate dimensions, then the survey 306 may include n sets of questions 306b, where each set is designed to elicit information about a corresponding dimension. For example, in one embodiment of the present invention, the survey 306 includes 30 loyalty climate dimension questions 306b, which are divided into 6 sets of five questions each. Each of the sets is designed to elicit information about a corresponding one of the six climate dimensions (Integrity, Competency, Proactivity, Recognition, Savvy, and Chemistry). The process may adapt the number of questions based on prior information, such as answers provided to initial questions.

The survey questions 306 may be phrased in any of a variety of ways, and the user's answers 308 may take any of a variety of forms. For example, in one embodiment each of the loyalty climate dimension questions 306b is phrased as a statement about the corresponding dimension, in response to which the user 302 provides a number ranging from 1-10, where higher numbers indicate stronger agreement with the statement. Consider, for example, the statement "Acts fairly in ambiguous or problematic situations." A user who inputs a 10 in response to this statement strongly agrees that his relationship partner acts fairly in ambiguous or problematic situations, while a user who inputs a 1 in response to this statement strongly disagrees that his relationship partner acts fairly in ambiguous or problematic situations. Note, however, that this is merely one example of a form that user input may take and does not constitute a limitation of the present invention.

A loyalty measurement engine 310 identifies a loyalty index 312, which characterizes the degree of loyalty of the user 302 to the other relationship partner, based on the user's answers 308 (step 406). More specifically, the loyalty measurement engine 310 may include a loyalty level identifier 314, which identifies a loyalty level 316 of the user 302 based on the user's answers 308a to the loyalty questions 306a (step 406a). The loyalty measurement engine 310 may also include a dimension score identifier 318, which identifies loyalty climate dimension scores 320a-n, one for each of the n loyalty climate dimensions, based on the user's answers 308b to the loyalty climate dimension questions 306b (step 406b).

The dimension score identifier 318 may identify the dimension scores 320a-n in any of a variety of ways. For example, to produce a dimension score for the Competency dimension, the dimension score identifier 318 may simply sum the user's responses to the five Competency survey questions, each of which falls on a scale of 1-10, thereby producing a dimension score ranging from 5-50. This method of producing dimension scores is merely one example and does not constitute a limitation of the present invention.

The loyalty measurement engine 310 may also include a loyalty index identifier 322, which identifies the user's loyalty index 312 based on the user's loyalty level 316 and the user's loyalty climate dimension scores 320a-n (step 406c). Examples of techniques that may be used by the loyalty index identifier 322 to identify the loyalty index 312 will now be described.

Figure 5:
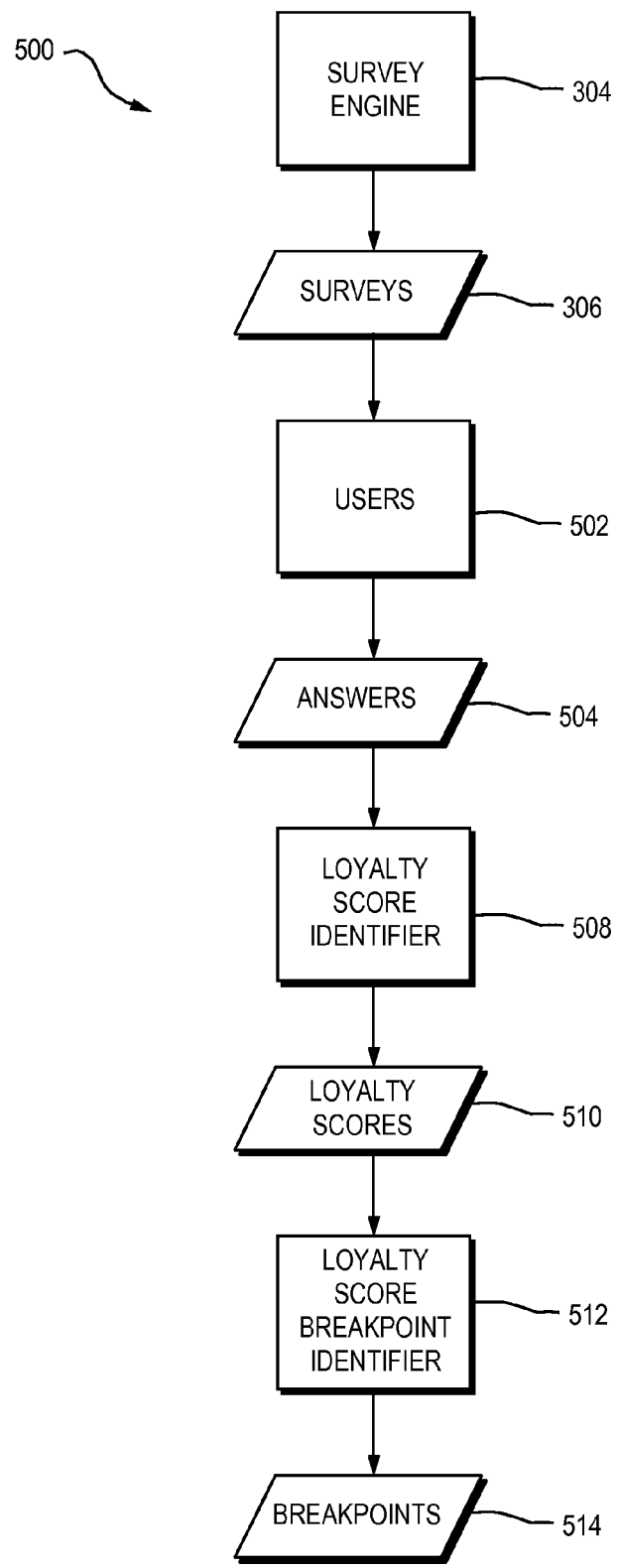
FIG. 5 is a dataflow diagram of a system for surveying a plurality of users and deriving statistics from the answers provided by those users for use in loyalty index identification according to one embodiment of the present invention.
Figure 6:
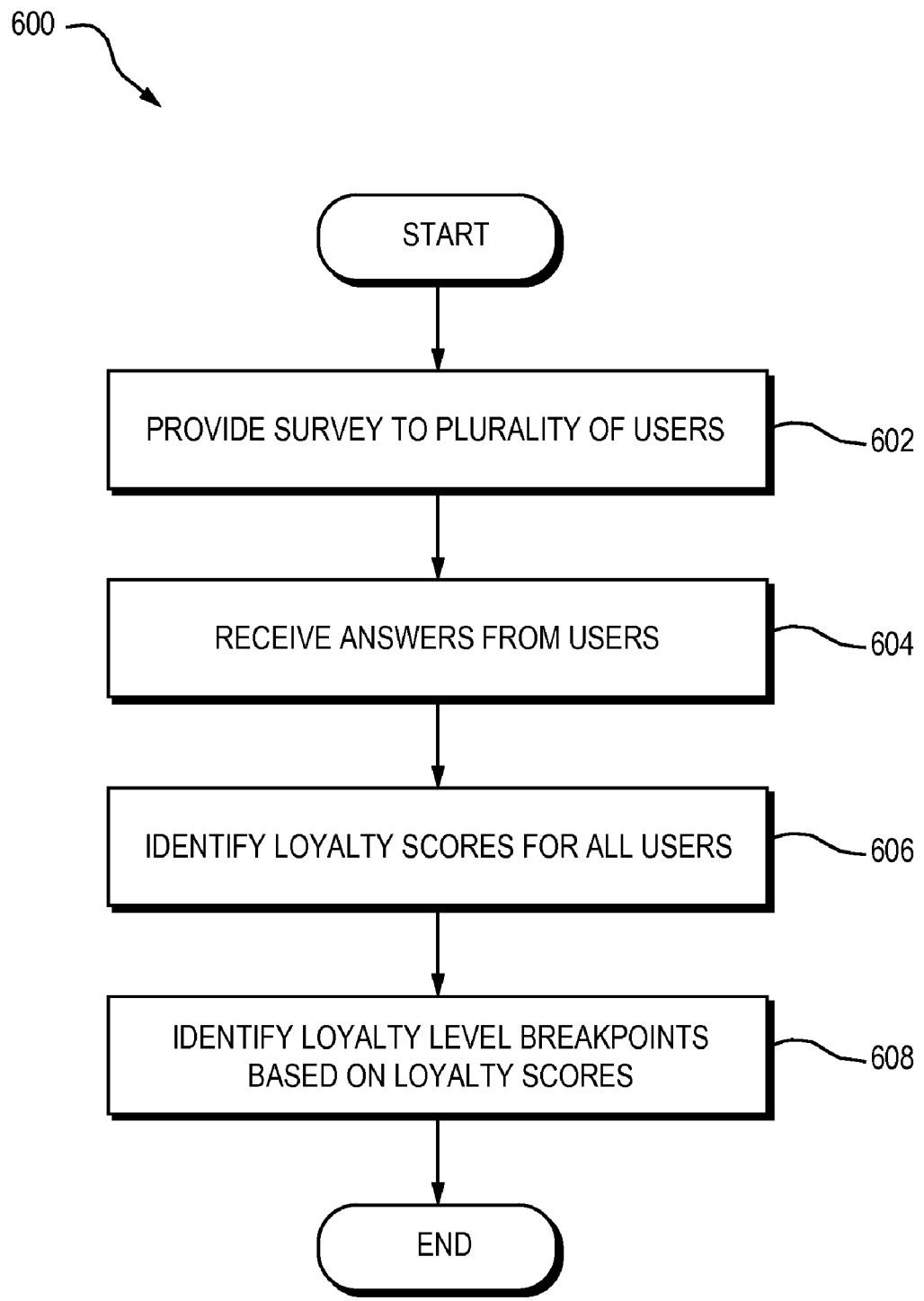
FIG. 6 is a flowchart of a method performed by the system of FIG. 5 according to one embodiment of the present invention.

To produce the loyalty index 312 for the user 302, surveys must first be provided to a plurality of users. Referring to FIG. 5, a dataflow diagram is shown of a system 500 for surveying a plurality of users and deriving statistics from the answers 504 provided by those users 502 for use in loyalty index identification according to one embodiment of the present invention. Referring to FIG. 6, a flowchart is shown of a method 600 performed by the system 500 of FIG. 5 according to one embodiment of the present invention.

The survey engine 304 provides the survey 306 to a plurality of users 502, in the manner described above with respect to step 402 of FIG. 4 (FIG. 6, step 602). The users 502 may include the user 302 shown in FIG. 3. The users 502 provide answers 504 to the survey engine 304, in the manner described above with respect to step 404 of FIG. 4 (FIG. 6, step 604). The answers 504 shown in FIG. 5, therefore, include a complete set of answers (of the kind shown in FIG. 3 as answers 308) for each of the users 502.

The system 500 may also include a loyalty score identifier 508 which identifies loyalty scores 510 for the users 502 (step 606). If, for example, the loyalty answers provided by the users 502 are provided in the form of numbers representing degrees of agreement with the loyalty questions 306a, then the loyalty score identifier 508 may identify the loyalty score of each user by summing the values of that user's loyalty answers. Note, however, that this method of producing a loyalty score is merely one example and does not constitute a limitation of the present invention.

The system 500 includes a loyalty score breakpoint identifier 512 which uses the loyalty scores 510 to identify a set of breakpoints 514 which divide the loyalty scores 510 into different segments corresponding to different loyalty levels (step 608). For example, in one embodiment of the present invention, the breakpoint identifier 512 applies a K-means analysis to the loyalty scores 510 to identify the breakpoints 514. Although in the following example a 4-cluster K-means analysis is used, corresponding to the four loyalty levels described above, this is not a limitation of the present invention. The K-means approach to clustering is a well-known clustering technique which performs an iterative alternative fitting process to form the number of specified clusters. The K-means analysis clusters the pre-existing user loyalty scores 510 into an initial set of four clusters. The K-means analysis is repeated to maximize inter-cluster distance until no more changes are found.

Figure 7:
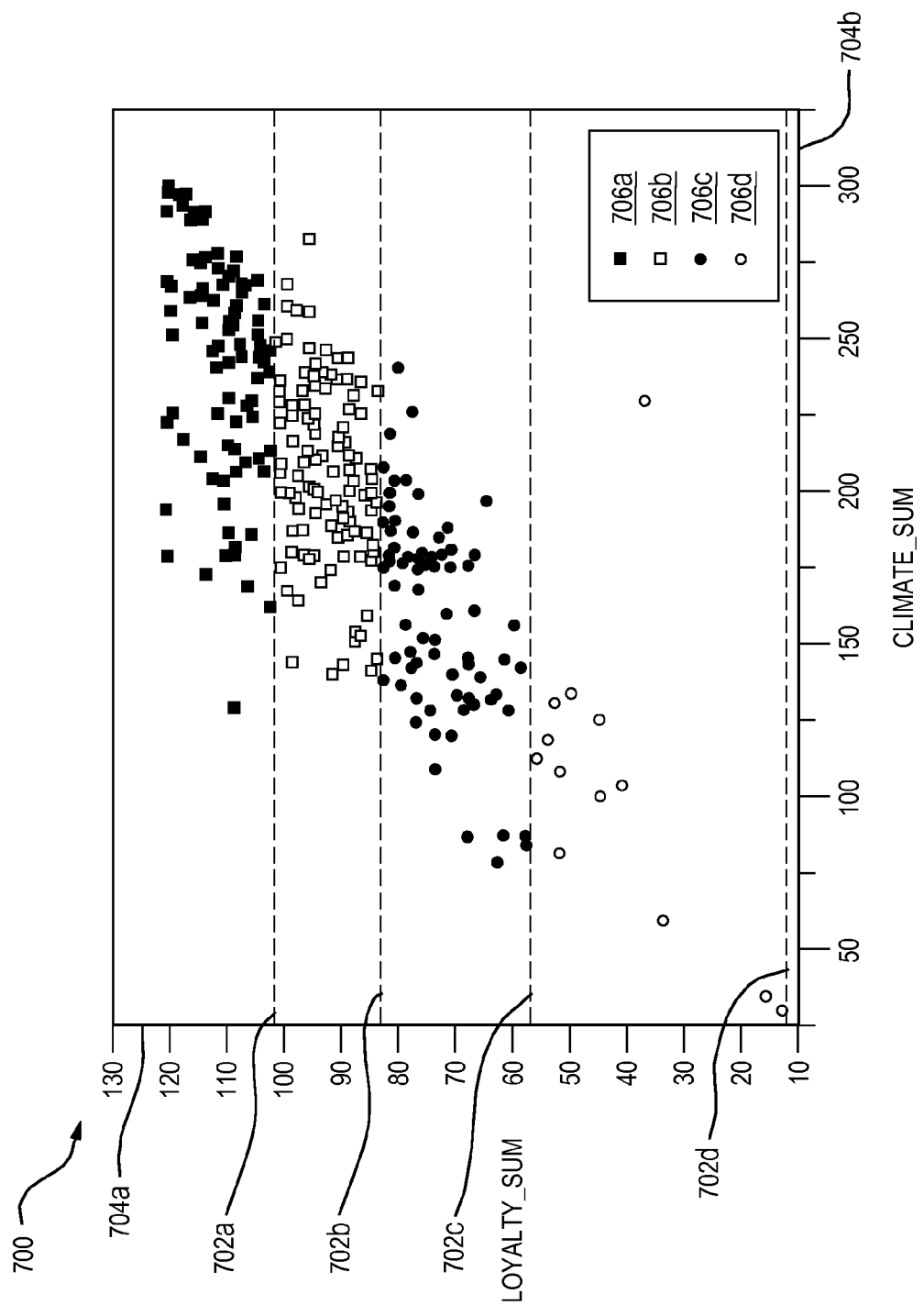
FIG. 7 is a graph which plots loyalty scores against aggregate dimension scores according to one embodiment of the present invention.

Referring to FIG. 7, a graph 700 is shown which plots loyalty scores on axis 704a against aggregate dimension scores 506 on axis 704b. Clusters 706a-d were produced automatically using the K-means analysis described above, resulting in breakpoints 702a-d, respectively, between clusters 706a-d. In the embodiment described above, in which there are four loyalty levels labeled −1, 1, 2, and 3, the four clusters 706a-d correspond to loyalty levels −1, 1, 2, and 3, respectively.

Figure 8:
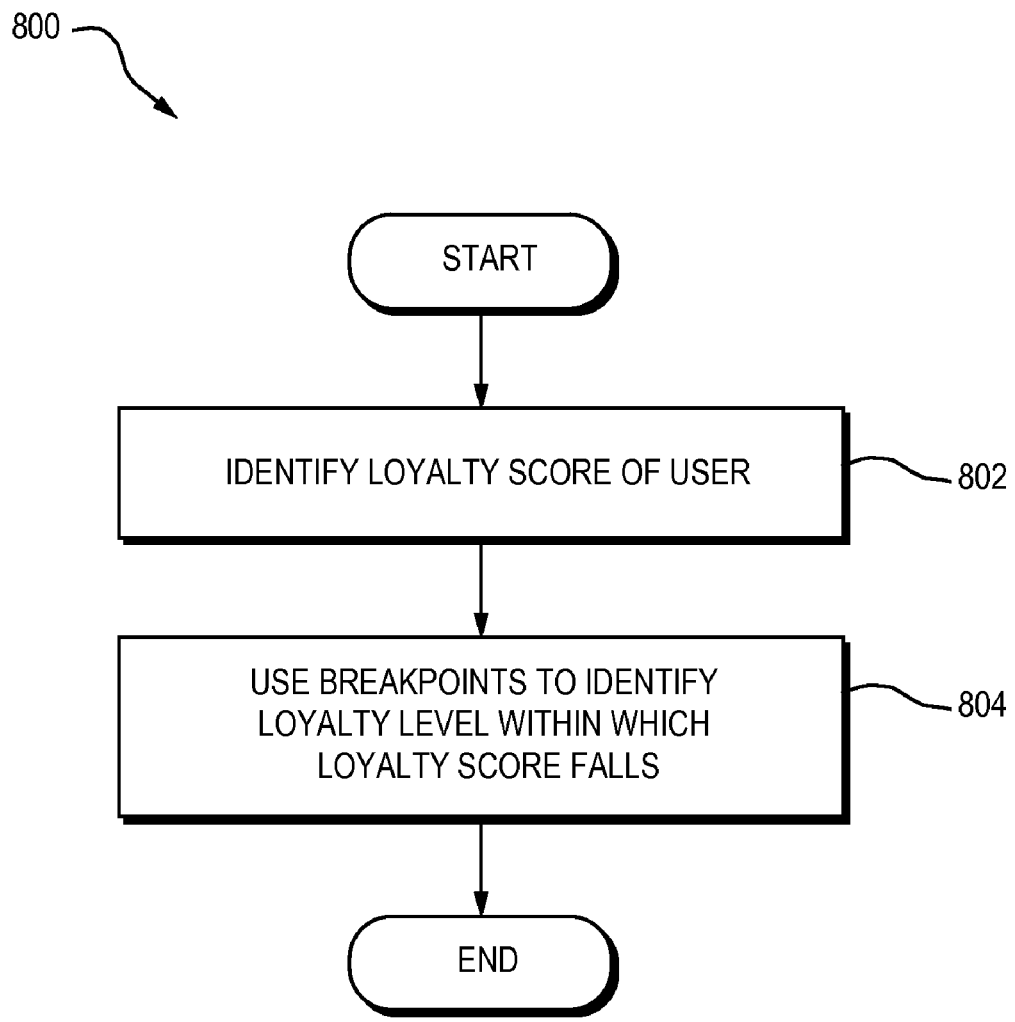
FIG. 8 is a flowchart of a method for using breakpoints to identify the loyalty level of a particular user according to one embodiment of the present invention.

Once the breakpoints 514 are identified, the loyalty level identifier 314 may use the breakpoints 514 to identify the loyalty level 316 (FIG. 3) of an individual user 302, as shown in the method 800 of FIG. 8. In particular, the user's loyalty answers 308a may be used to develop a loyalty score for the user 302 (such as by summing the loyalty answers 308a) (step 802). The loyalty level identifier 314 may then use the breakpoints 514 to identify the loyalty level within which the user's loyalty score falls (step 804). Alternatively, if the user's loyalty answers 308a were among the answers 504 that were used to identify the breakpoints 514, then the loyalty level 316 of the user 302 may be identified simply by identifying the cluster within which the user's loyalty score falls, as determined by the K-means analysis.

As mentioned above, once the loyalty levels and loyalty climate dimension scores have been identified for the set of users 502 using the techniques described above, the loyalty index identifier 322 (FIG. 3) may use these values to identify the loyalty index of each of the users 502. Each user's loyalty index is a single value which characterizes that user's loyalty to another relationship partner.

Figure 9:
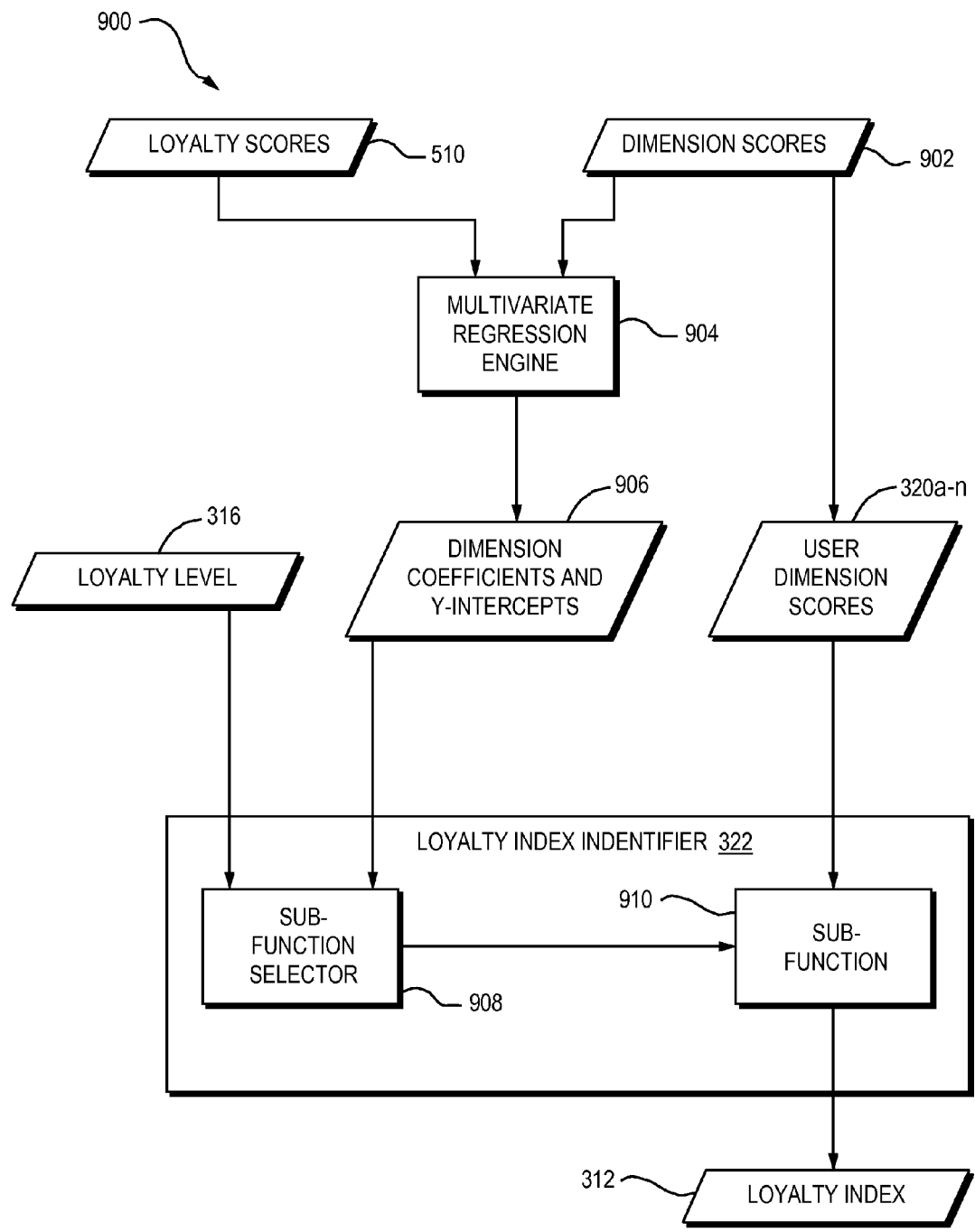
FIG. 9 is a dataflow diagram of a system for calculating loyalty indices for users according to one embodiment of the present invention.
Figure 10:
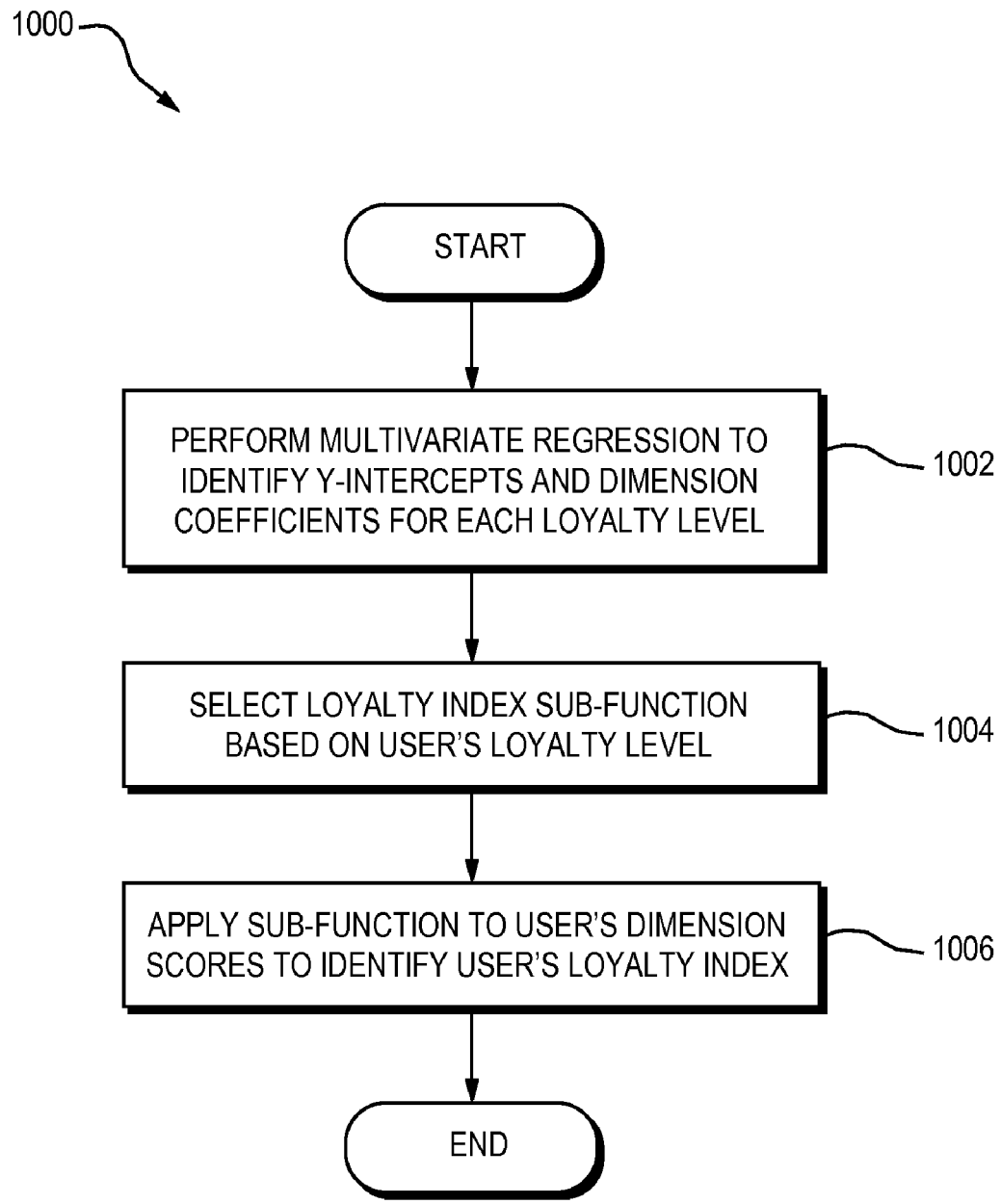
FIG. 10 is a flowchart of a method performed by the system of FIG. 9 according to one embodiment of the present invention.

For example, FIG. 9 is a dataflow diagram of a system 900 for calculating loyalty indices 902 for the users 502 according to one embodiment of the present invention. FIG. 10 is a flowchart of a method 1000 performed by the system 900 of FIG. 9 according to one embodiment of the present invention.

The system 900 includes a multivariate regression engine 904 which performs multivariate regression on all users 502, by loyalty level, of the users' loyalty climate dimension scores 902 against the loyalty scores 502 (FIG. 10, step 1002). (Note that the dimension scores 902 include the scores of each of the users 502 for each of the loyalty climate dimensions, and therefore differ from the aggregate dimension scores 506 shown in FIG. 5.) The multivariate regression engine 906 produces, for each of the loyalty levels: (1) a y-intercept, and (2) a coefficient for each of the dimensions. For each, if there are four loyalty levels and six loyalty climate dimensions, then the multivariate regression engine 904 produces four sets of values, where each set includes a single y-intercept and six coefficients.

The loyalty index identifier 322 (FIG. 3) may use the coefficients and intercepts 906, the loyalty level 316 of the user 302, and the dimension scores 320a-n of the user 302 to identify the loyalty index 322 of the user 302 as follows. The dimension coefficients and intercepts 906 effectively define a different sub-function for each of the loyalty levels. Therefore the loyalty index identifier 322 includes a sub-function selector 908 which uses the user's loyalty level 316 to select one y-intercept and set of dimension coefficients for use as a loyalty index sub-function 912 (step 904). The loyalty index identifier 322 then applies the sub-function 910 to the user's dimension scores 320a-n to produce the loyalty index 322 (step 1006).

For example, once a y-intercept and set of dimension scores have been identified based on the user's loyalty level 316, the user's loyalty index 322 may be identified by multiplying each of the dimension scores 320a-n scores by the corresponding coefficient in the sub-function 910, summing the resulting products, and adding the y-intercept of the sub-function 910 to produce the loyalty index 322. Note, however, that this is merely one example of a way in which the loyalty index 322 may be identified based on the dimension scores 320a-n.

Optionally, the resulting loyalty index 322 may be normalized relative to a sample of other loyalty indices. For example, if the resulting loyalty index 322 is normalized to a 100-point scale, the resulting normalized value represents the user's percentile within the set used for normalization. For example, if the user 302 is a customer of a company, a normalized loyalty index of 80 means that the customer 302 is more loyal to the company than 80 percent of other customers are to their companies.

Note that normalization may be performed within any subset of respondents. For example, if the total set of respondents includes customers of companies in many industries, then a separate normalization may be performed for each industry. One benefit of benchmarking by industry is that norms vary from industry to industry. As a result, performing a single normalization across all industries may not provide useful information.

From Knowledge to Practice

Once the user's loyalty level 316 has been identified, that loyalty level 316 may be used to identify actions that can be taken to improve the loyalty of the user 302. After all, the loyalty level 316 in isolation is devoid of actionable information. It does not provide any insight into why the relationship is the way it is, or how to strengthen it.

As mentioned above, the survey 306 may include questions 306c designed to elicit information about "practices"—behaviors engaged in by the other partners to the relationship. Practices may include any behaviors that one partner can engage in to affect the other partner's perception of the seller. For example, in one embodiment of the present invention, the survey includes 30 questions 306c related to practices, divided into 6 sets (one for each loyalty climate dimension) of 5 questions each. For each question, the user 302 is asked, "to what extent does your partner engage in this practice," where a response of "1" means "never" and a response of "10" means "always."

In the following example it will be assumed for ease of explanation that the survey 306 relates to a relationship between a company and a customer of a company. More specifically, the "practices" questions 306c of the survey 306 relate to the practices of the company and its representatives.

Figure 11:
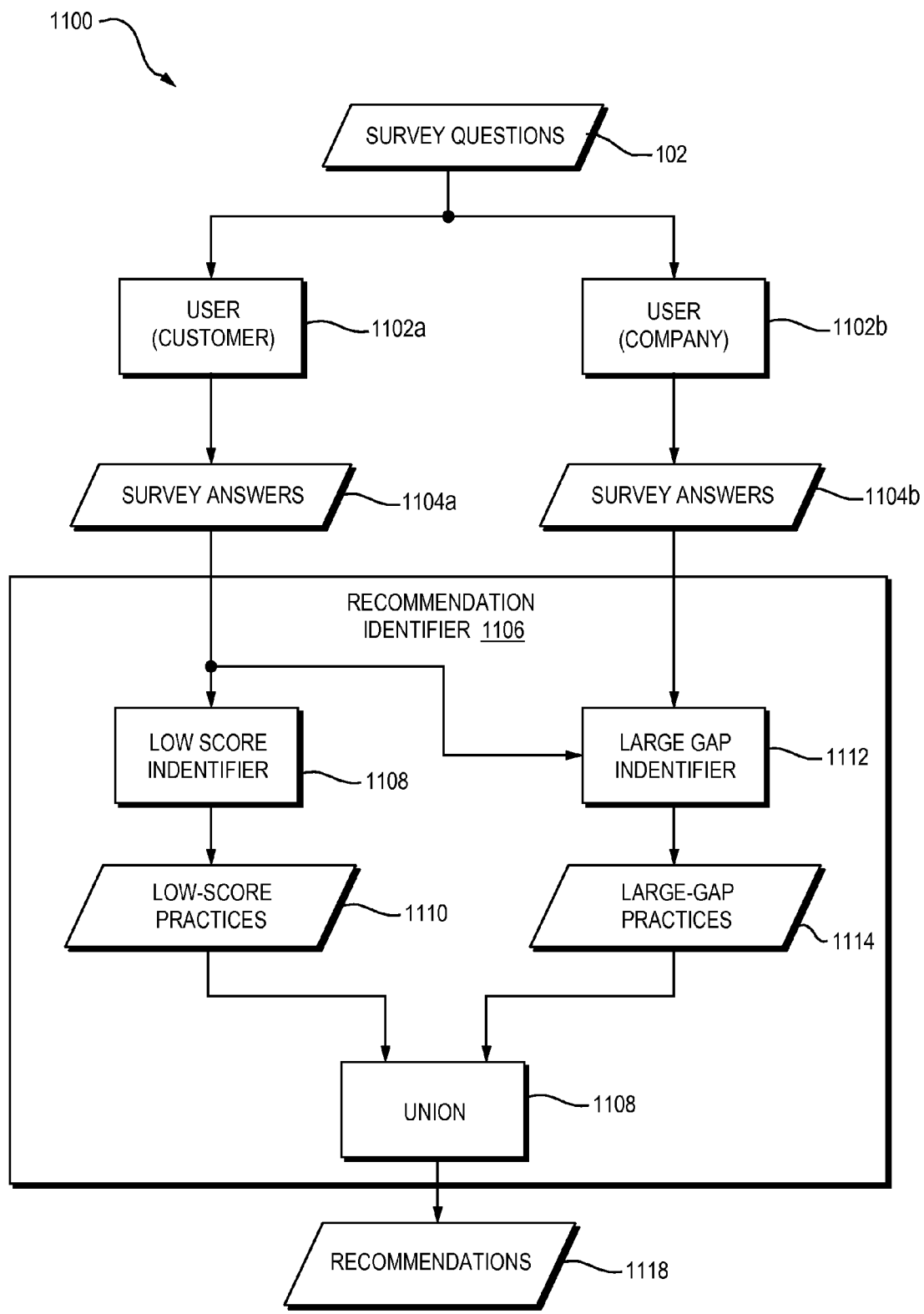
FIG. 11 is a dataflow diagram of a system for using questions about practices to identify actions to recommend to a user to improve the user's relationship with a relationship partner.
Figure 12A:
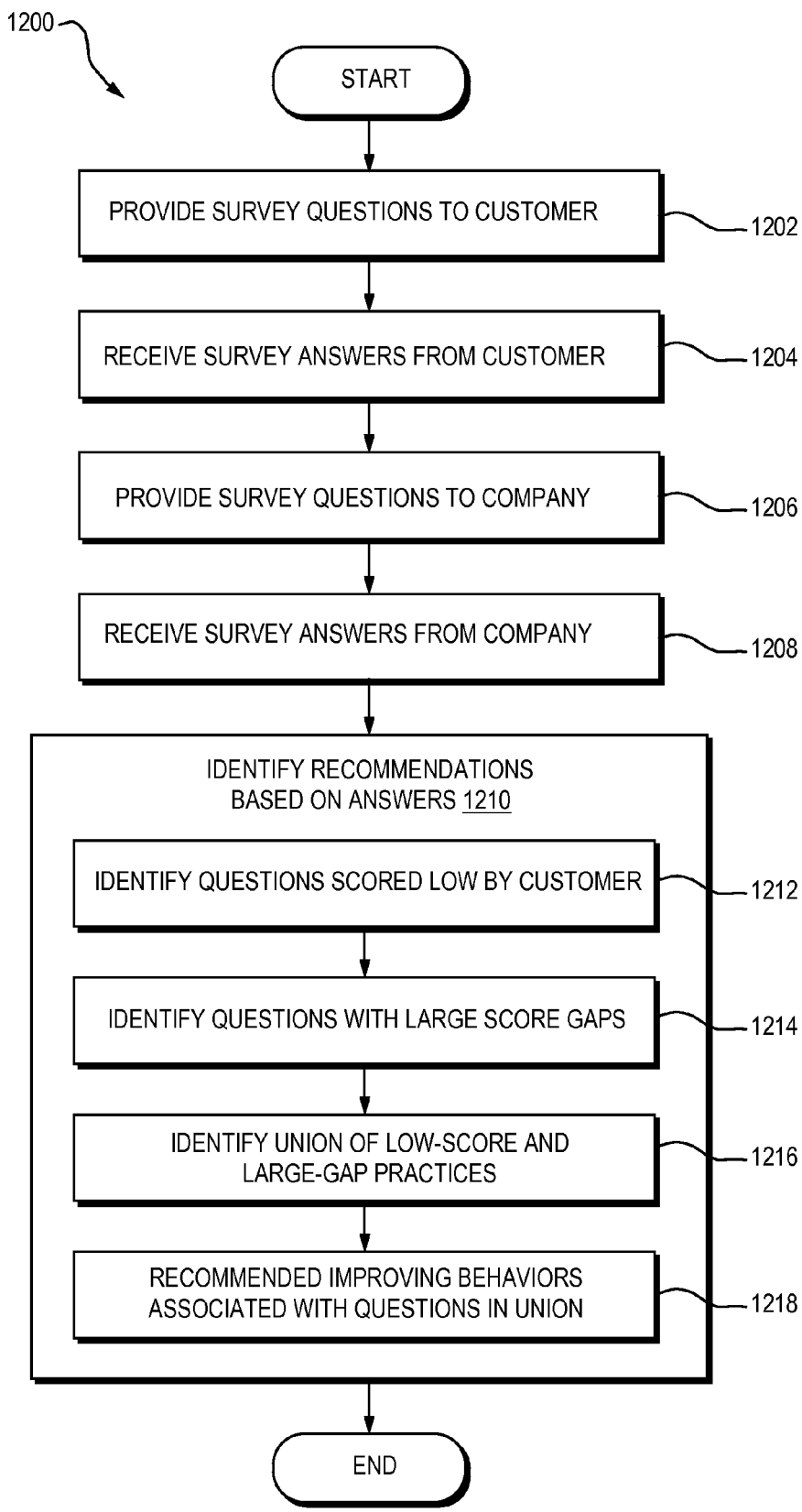
FIGS. 12A-12D are flowcharts of methods performed by the system of FIG. 11 according to various embodiments of the present invention.
Figure 12B:
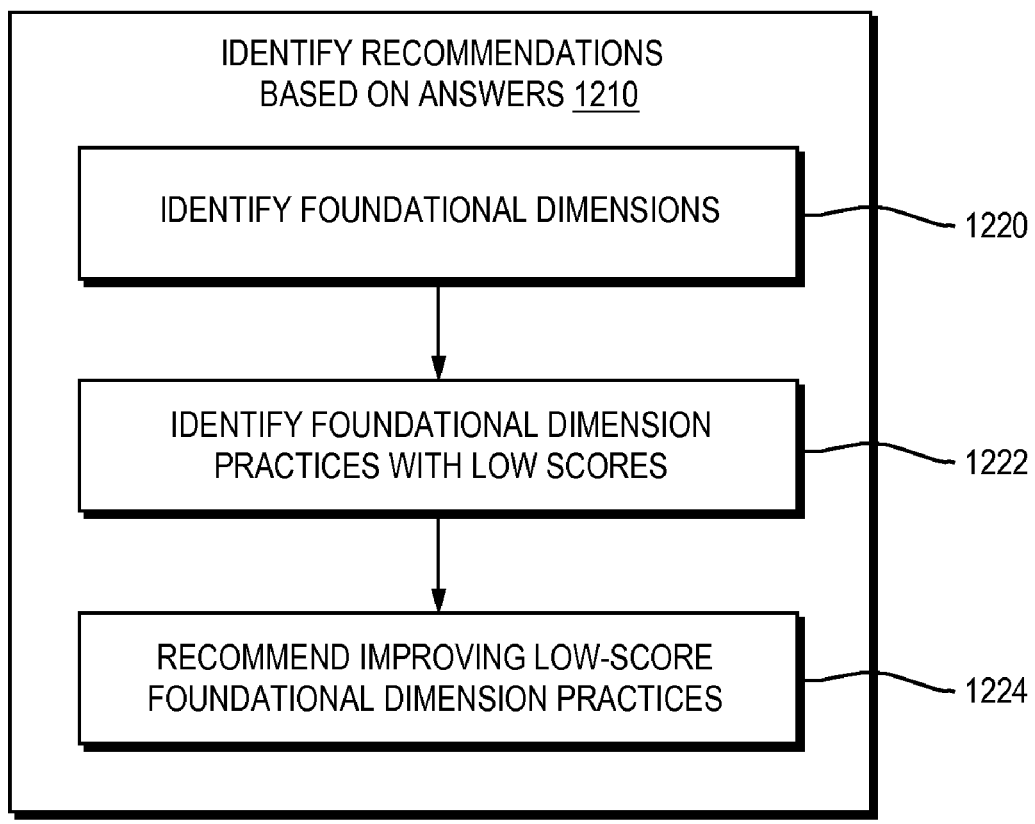

Referring to FIG. 11, a dataflow diagram is shown of a system 1200 for using such the survey questions 102 (such as the loyalty questions 306a, the dimension questions 306b, and/or the practices questions 306c) to notify a user of problem areas and/or to identify actions to recommend to a user to improve the user's relationship with a relationship partner. Referring to FIG. 12A, a flowchart is shown of a method 1200 performed by the system 1100 of FIG. 11 according to one embodiment of the present invention.

The practices questions 306c are provided both to a user 1102a (such as a customer) (step 1202), to elicit information 1104a (step 1204) about the customer's perception of a company's practices, and to the company 1102b (step 1206), to elicit information 1104b about the company's own perception of its practices in relation to the customer 1102a (step 1208). The answers 1104a-b provided by the customer 1102a and company 1102b are used to recommend behaviors 1118 to the company 1102b for improving the company's relationship with the customer 1102a (FIG. 11, element 1106; FIG. 12A, step 1210).

Such recommendations 1118 may take a variety of forms and be developed in a variety of ways. For example, as shown in FIGS. 11 and 12A, those questions 1110 which the customer 1102a answered with low scores (e.g., <5 on a scale of 1-10) may be identified (FIG. 11, element 1108; FIG. 12A, step 1212). Those questions 1114 for which there is a large gap (e.g., >5) between the score provided by the customer 1102a and the score provided by the company 1102b may be identified (FIG. 11, element 1112; FIG. 12A, step 1214). The recommendation identifier 1106 may identify the union of the low-score questions 1110 and the large-gap questions 1114 (FIG. 11, element 1116; FIG. 12A, step 1216) and recommend that the company 1102b and/or its representatives focus on improving behaviors associated with the questions that are in the union (FIG. 12, step 1218).

For example, if one of the loyalty questions 306a has a large gap, then the recommendation identifier 1106 may recommend improvement in behaviors which are known to improve loyalty. If one of the dimension questions 306 has a large gap, then the recommendation identifier 1106 may recommend improvement in behaviors which are known to improve the particular dimension associated with the question. If one of the practices questions 306c has a large gap, then the recommendation identifier 1106 may recommend improvement in the specific practice associated with the question.

The recommendations 1118 may take any of a variety of forms. For example, the recommendations 1118 may take the form of a notification that a particular question, dimension, or practice having a large gap has been identified. Such a gap represents a potential blindspot in the relationship. The relationship partner (e.g., company) may then decide how to address that blindspot to improve the relationship. The recommendations 1118 may, however, include not only a list of blindspots to improve upon, but also specific suggestions for how to reduce or eliminate such blindspots. For example, the following is a sample list of practices that we have found to be statistically correlated with loyalty climate:

acting professionally with courtesy and respect (Integrity);
    preparing thoroughly before any interaction with a customer (Competency);
    conducting business around the customer's schedule (Recognition);
    ensuring that the customer does not encounter any surprises (Proactivity);

looking beyond immediate problems to identify patterns and connections (Savvy); and relating to the customer on a personal level (Chemistry).

Therefore, if the recommendation identifier 1106 determines that there is a blindspot (large gap) in Integrity, the recommendation identifier 1106 may recommend that the company 1102b act more professionally with courtesy and respect, and provide specific examples of behaviors that are professional, courteous, and respectful.

The recommendation identifier 1106 may recommend that practices related to Satisfiers (e.g., Competency and Integrity) be improved first, i.e., before improving practices related to other loyalty climate dimensions, even if practices in those other dimensions have lower customer scores and/or larger gaps than the Satisfier practices. The justification for preferring improvements in Satisfier practices is that Satisfiers are necessary foundations for a solid relationship and therefore need to be developed before practices related to the other dimensions. This approach is reflected in FIG. 12B, in which a set of foundational dimensions, such as Satisfier dimensions, is identified (step 1220), and the practices which fall within those foundational dimensions and which have low scores are identified (step 1222). The recommendation identifier 1106 then recommends that the practices identified in step 1222 be improved (step 1224).

Figure 12C:
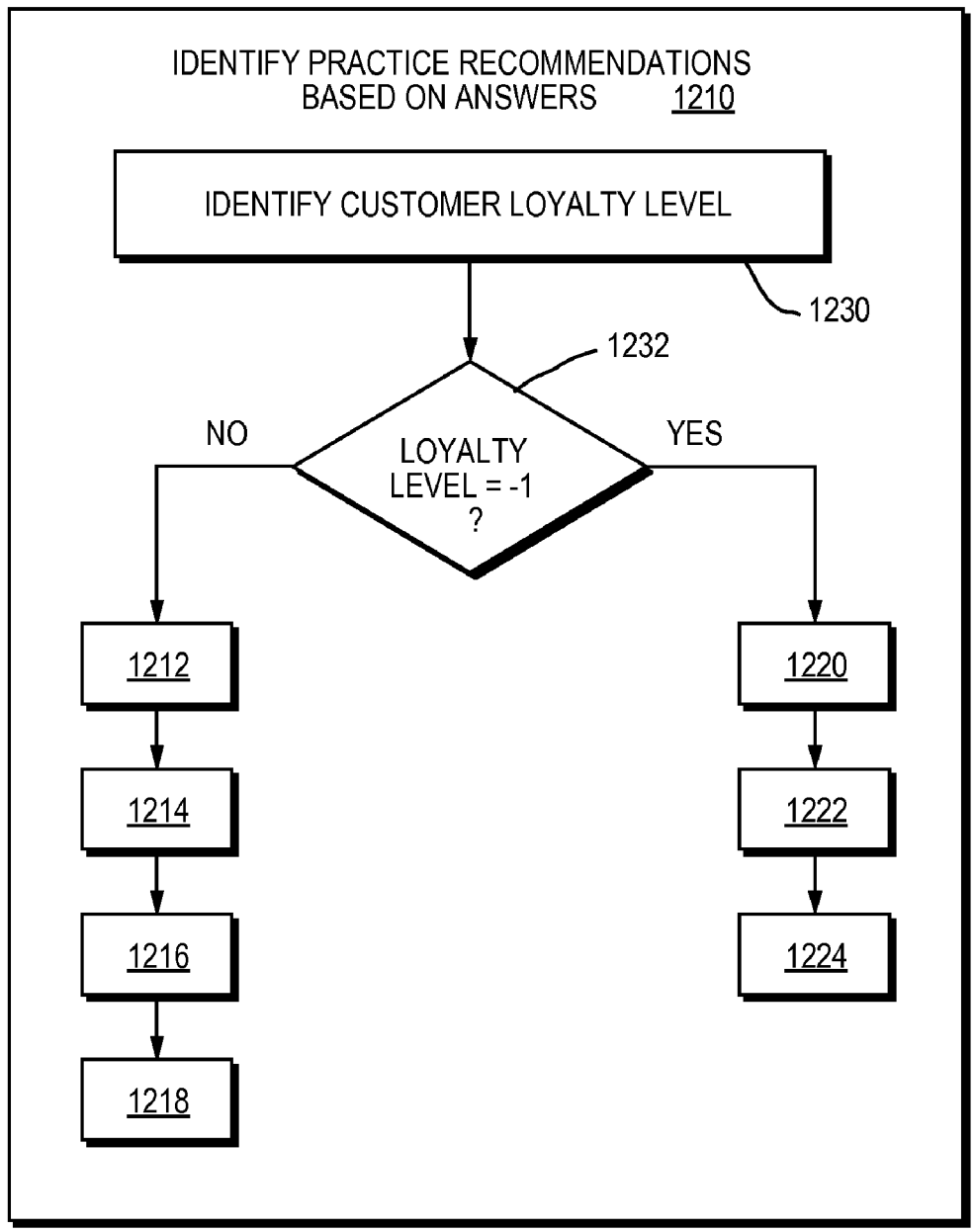

The recommendation identifier 1106 need not, however, express a preference for improving Satisfier (or other foundational) practices over other practices for all users. For example, as shown in FIG. 12C, the recommendation identifier 1106 may only express a preference for improving satisfier practices for those customers having a loyalty level of −1 (steps 1230, 1232). In other words, if the customer's loyalty level is −1 (step 1232), then the recommendation identifier 1106 identifies the recommendations 1118 using the techniques described above with respect to FIG. 12B. Otherwise, the recommendation identifier 1106 identifies the recommendations 1118 using the techniques described above with respect to FIG. 12A. The justification for this is that relationships with customers having very low loyalty will not improve unless Satisfiers are improved first, while the loyalty of customers whose loyalty is already higher may be more susceptible to improvements in non-Satisfier practices even if their Satisfier practice scores are low.

Figure 12D:
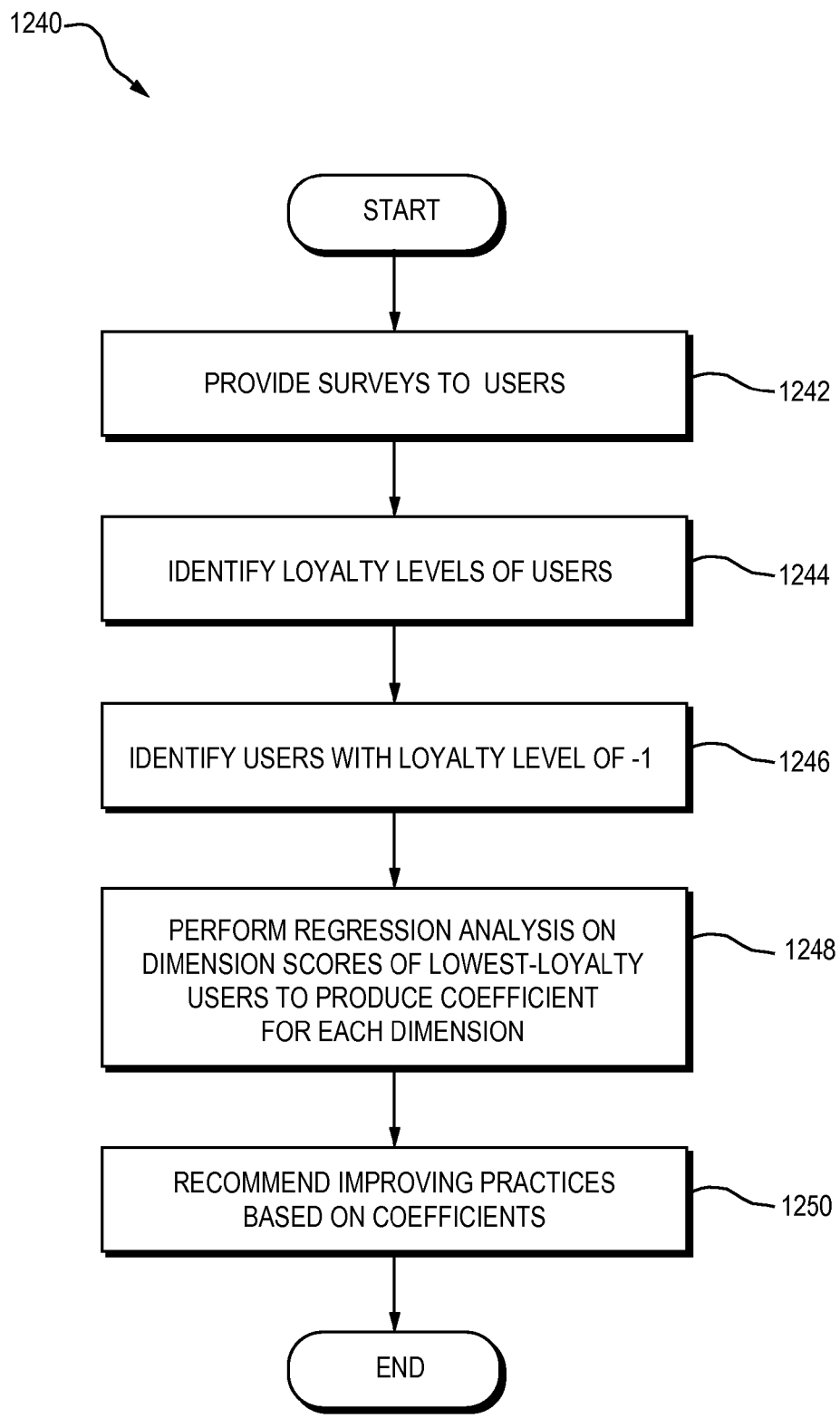

We have found by empirical analysis, however, that Satisfier practices (e.g., Integrity and Competency) are not always the most important practices to increase early. More specifically, as shown in FIG. 12D, we reached this conclusion by regressing each loyalty climate dimension score for customers with −1 loyalty levels (steps 1242-1248). This resulted in six coefficients—one for each loyalty climate dimension. We found that the Integrity and Competency coefficients were not necessarily the highest coefficients for customers with −1 loyalty levels (i.e., the lowest possible loyalty level).

Therefore, the recommendation identifier 1106 may use empirical results, such as those described above, to make the recommendations 1118 about which dimension's practices to improve first. More specifically, the recommendation identifier 1106 may perform a regression analysis on the loyalty climate dimension score of customers with a −1 loyalty level to produce a coefficient for each dimension (steps 1244-1248). The recommendation identifier 1106 may then recommend improving the practice associated with the highest coefficient first, improving the practice associated with the second-highest coefficient second, and so on (step 1250).

The intuition that practices associated with Satisfiers (e.g., Competency and Integrity) should be improved first may be combined with the empirical analysis described above in a variety of ways. For example, the recommendation identifier 1106 may perform the regression described above to produce coefficients for all of the loyalty climate dimensions (step 1248), and then weight Satisfier practices more heavily than non-Satisfiers practices, such as by increasing the coefficients for the Satisfiers practices scores by 10% (step 1250).

One benefit of the techniques disclosed herein is that they were developed using rigorous quantitative analytical methods and have been empirically validated using real customer data from a range of industries. Tests of the techniques disclosed herein demonstrate that they can be used to identify at-risk customers before they defect, help augment the quality of existing relationships, and increase the percentage of customers' book of business that clients are able to capitalize on. As such, the loyalty climate developed for a particular relationship using the techniques disclosed herein serves as a leading indicator for both customer retention and value.

For example, data from a large international insurance company demonstrates that customers who defect after filling out surveys have a statistically significantly different distribution of loyalty scores. Customers who subsequently defect have loyalty scores which are on average 10 points lower than other customers (65 vs. 75). Furthermore, 59% of lost customers had loyalty levels of −1 or 1, compared to only 33% of retained customers. No customers with loyalty levels of 3 were lost. Finally, as the loyalty level of customers increases, their probability of defecting decreases by more than half—from 3.09% at level 3 to 1.23% at level 1. These numbers demonstrate that the techniques disclosed herein can identify at-risk customers before they defect.

Furthermore, the techniques disclosed herein may be used not only to identify at-risk customers but also to act to increase the loyalty of customers across-the-board. Examining longitudinal data for customers spanning three years reveals significant increases in loyalty. A matched-pairs analysis of these longitudinal survey results for individual customers shows an average increase in Loyalty Index of 9.4 points across all loyalty levels. Loyalty gains are even more remarkable when considering only customers whose initial survey results indicated a level 1 relationship; these relationships experienced a 14.6 point increase over two years.

Furthermore, data measuring the percent of a customer's book of business earned shows clear gains in the proportion of business earned as loyalty increases. Moving from level 1 to level 3, the percent of customers indicating that their partners earn more than 90% of their book of business increases from 6% to 11%. Conversely, the percent of customers indicating that their partners earn less than 10% of their book of business decreases from 36% to 24%. This indicates that as loyalty among customers increases, so does their value. Taken together, these numbers demonstrate that increasing customer loyalty as measured using the techniques disclosed herein increases the proportion of customers' book of business that partners are able to capitalize on.

One reason that the techniques disclosed herein are effective is that they focus on changing an aspect of the relationship—its climate—that is much more susceptible to being modified by one party than attempts to change the behavior of the other party directly. Although the behavior of a particular person may be changed by changing the person or by changing the person's environment (climate), it is notoriously difficult to change people directly, both because people do not like to change and because personal needs remain stable over very long periods of time. Therefore, one is more likely to change a person's behavior with less effort by attempting to change that person's environment (climate) than by attempting to change the person directly.

Where there is an interpersonal interaction between a provider and a customer, the aroused motivation of customers is determined by the loyalty climate that they experience. Furthermore, the practices of a company's customer-facing people have the same determining effect on loyalty climate as leadership practices do on organizational climate. Moreover, loyalty climate, like organizational climate, influences behavior even when the people who created that climate are no longer in direct contact with the customer. Embodiments of the present invention, therefore, which focus on changing the loyalty climate, are more likely to be effective at increasing customer loyalty than techniques which attempt to change the customer's behavior or perceptions directly.

Furthermore, loyalty climate is a more reliable indicator than other common measures of loyalty, such as customer satisfaction. The evidence for the relationship between satisfaction and loyalty is very limited. Although it is almost impossible to earn true loyalty without first earning high levels of satisfaction, there are significant differences in the amount of business and the amount of loyalty you obtain from customers and partners who are merely satisfied and those who score high on the six loyalty climate dimensions described herein. In fact, in one recent study of business-to-business customers, we found that over 50% of lost customers were more satisfied than retained customers. Satisfaction, in other words, is a necessary but not sufficient condition for high loyalty.

Furthermore, although it may be true that highly satisfied customers are likely to be loyal customers and that highly dissatisfied customers are likely to be disloyal customers, customers falling in the large middle range of satisfaction may or may not be loyal. Therefore, satisfaction is at best useful only as a very rough measure of the loyalty of the most and least loyal customers, but does not provide a basis for measuring the loyalty of customers whose loyalty is neither very high nor very low. Yet these are precisely the customers whose loyalty is most susceptible to being influenced positively by improvements to the loyalty climate. The techniques disclosed herein may be used not only to measure loyalty across the full range of loyalties but also to identify concrete behaviors that may be used to increase the loyalty of customers of all loyalties.

Furthermore, other existing metrics of customer loyalty fail to capture the full texture of relationships. For example, in his book, *The Ultimate Question*, Fred Reichheld reduces the measurement of customer loyalty to the answer to one question—"Would you recommend us to a friend?"—and one key metric—the Net Promoter Score (NPS). Customer loyalty, however, cannot be fully captured based on the answer to such a single question, for all of the reasons provided above. The techniques disclosed herein, in contrast, enable customer loyalty to be measured along a variety of dimensions, without introducing subjectivity into the measurement of loyalty. The techniques disclosed herein, in other words, provide an accurate, actionable, and objective measure of loyalty that may be used to identify concrete actions that may be taken to improve the climate of a relationship and thereby increase loyalty.

The loyalty climate dimensions described herein were identified objectively, not subjectively. As described above, these dimensions were identified by conducting surveys and conducting factor analyses of the survey results to identify questions which clustered together. Each cluster was then associated with a loyalty climate dimension. Each dimension was then assigned a label, such as "Competency" or "Integrity." Although the choice of label, such as "Competency" rather than "Skill," may be subjective, the clustering of questions into a common dimension resulted from objective analysis of the data. As a result, the techniques disclosed herein may be applied reliably and repeatedly to other data sets, and the loyalty climate dimensions disclosed herein are more likely to accurately represent different relationship dimensions than those chosen subjectively or independently of actual data.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The term "partner" is used herein to refer to any party to a relationship, such as a customer, vendor, contractor, friend, civic organization, employee, or employer. Although customers and the companies from which they purchase products and services are used throughout the discussion above as examples of partners, such examples apply more generally to any kinds of partners. Furthermore, the techniques disclosed herein apply not only to commercial relationships but also to non-commercial relationships. A "relationship" as that term is used herein may include two or more partners.

Although some of the examples provided herein involve four loyalty levels labeled −1 (antagonistic), 1 (transactional), 2 (predisposed), and 3 (loyal), the techniques disclosed herein may be applied to any number of loyalty levels, labeled in any manner. The labels attached to loyalty levels, such as −1, 1, 2, and 3, and "antagonistic," "transactional," "predisposed," and "loyal," need not have any impact on how those loyalty levels are used to measure the climate of a relationship and/or the loyalty of partners in that relationship.

Similarly, although certain examples disclosed herein involve six loyalty climate dimensions having particular labels (Integrity, Competency, Proactivity, Recognition, Savvy, and Chemistry), the techniques disclosed herein may be applied to any number of loyalty climate dimensions, labeled in any manner. Furthermore, although it was described herein that the loyalty climate dimensions may be developed by conducting a series of surveys relating to the practices and perceptions of actual business partners, and then applying factor analyses to the survey results to discover which questions clustered together, this is merely an example and does not constitute a limitation of the present invention. Rather, loyalty climate dimensions may be identified in other ways.

Although in certain embodiments disclosed herein the user provides input in the form of answers to survey questions, this is merely an example and does not constitute a limitation of the present invention. Rather, users may provide input in any of a variety of forms, such as in free-form text, and using any of a variety of modalities, such as text or speech.

Furthermore, the particular structure and contents of the surveys disclosed herein are merely examples and do not constitute limitations of the present invention. For example, the number of questions in the survey, or any part of the survey, may vary from the numbers described herein. Different numbers of questions may be provided for different dimensions and/or practices. Different surveys may be provided to different users. Questions may be phrased, for example, as yes/no questions, multiple choice questions with any number of choices, or questions soliciting free-form textual answers. Although the examples of questions disclosed herein solicit information about loyalty climate dimensions only indirectly, questions may be provided which solicit direct information about loyalty climate dimensions. For example, a question may solicit information about Competency by asking the user to "Rate the competency of your partner on a scale of 1-10."

Furthermore, although in the examples disclosed herein, each loyalty climate dimension question solicits information that is used to derive a single loyalty climate dimension score, this is not a limitation of the present invention. Rather, the answer to a single question may be used to derive loyalty climate dimension scores for multiple dimensions in any of a variety of ways.

Although in the example described above, the coefficients and intercepts associated with each loyalty climate dimension are computed once, this is not a limitation of the present invention. Rather, for example, the coefficients and intercepts may be updated when additional survey answers are obtained. For example, when a new user submits survey answers, the system may add those answers to the database of existing answers and recompute the coefficients and intercept using the techniques disclosed above. To limit the amount of data maintained by the system, and to account for "loyalty inflation"—increases in average loyalty over time as performance increases across the board—the number of survey results stored in the system may be limited to some fixed number, such as 400. If adding a new set of survey answers would increase the total number of survey results stored by the system to greater than 400, then the oldest set of survey answers may be deleted from the system when the new set of answers is added.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor executing computer program instructions tangibly stored on a non-transitory computer-readable medium, wherein the method comprises:
   (A) identifying a loyalty level of a first partner in a relationship based on first input provided by the first partner, wherein a loyalty climate model is characterized by the loyalty level, wherein the loyalty climate model characterizes a relationship between the first partner and a second partner in the relationship;
   (B) identifying values of a plurality of dimensions of loyalty of the first partner to the second partner in the relationship based on second input provided by the first partner, wherein the loyalty climate model is further characterized by the values of the plurality of dimensions of loyalty;
   (C) identifying a loyalty sub-function based on the identified loyalty level, wherein (C) comprises:
      (C)(1) performing multivariate regression on the plurality of loyalty scores and the plurality of sets of dimension values to produce a plurality of pairs of coefficients and y-intercepts; and
      (C)(2) identifying the loyalty sub-function based on the identified loyalty level and the plurality of pairs of coefficients and y-intercepts;
   (D) applying the identified sub-function to the plurality of dimension values to identify a loyalty index associated with the first partner, wherein the loyalty climate model is further characterized by the loyalty index;
   (E) identifying a plurality of loyalty scores for a plurality of people; and
   (F) identifying a plurality of sets of values of the plurality of dimensions of loyalty, wherein each of the plurality of sets of values corresponds to a distinct one of the plurality of people.

2. The method of claim 1, wherein the plurality of dimensions consists of six dimensions.

3. The method of claim 1, wherein (C) comprises selecting the loyalty sub-function from a set of four loyalty sub-functions.

4. The method of claim 1, further comprising:
   (G) before (A), providing a survey to the first partner, the survey comprising a plurality of questions; and
   wherein the first input comprises answers provided by the first partner to the plurality of questions.

5. The method of claim 1, further comprising:
   (G) before (A), providing a survey to the first partner, the survey comprising a plurality of questions; and
   wherein the second input comprises answers provided by the first partner to the plurality of questions.

6. The method of claim 5, wherein the plurality of questions comprises a plurality of groups of questions, wherein each group in the plurality of groups corresponds to a distinct one of the plurality of dimensions of loyalty.

7. The method of claim 1, further comprising:
   (G) before (A), providing a survey to a plurality of people, the survey comprising a plurality of questions;

(H) receiving, from the plurality of people, a plurality of sets of answers to the plurality of questions;
(I) identifying a plurality of clusters of the plurality of questions; and
(J) identifying the plurality of dimensions of loyalty based on the identified clusters.

8. The method of claim 7, wherein (I) comprises applying factor analysis to the plurality of sets of answers to identify the plurality of clusters.

9. The method of claim 1, further comprising:
(G) identifying a plurality of loyalty scores for a plurality of people;
(H) applying cluster analysis to the plurality of loyalty scores to identify a plurality of clusters; and
(I) identifying a plurality of breakpoints between the plurality of clusters.

10. The method of claim 9, wherein (A) comprises:
(A)(1) identifying a loyalty score of the first partner in the relationship; and
(A)(2) identifying the loyalty level of the first partner in the relationship based on the loyalty score and the plurality of breakpoints.

11. The method of claim 1, wherein the plurality of dimensions comprises dimensions of integrity, competency, recognition, proactivity, savvy, and chemistry.

12. The method of claim 1, wherein the plurality of dimensions comprises: (1) at least one satisfier dimension representing at least one pre-requisite that needs to be satisfied in order to maintain the relationship; and (2) at least one motivator dimension representing at least one aspect of the relationship that tends to motivate the first partner and the second partner.

13. The method of claim 12, wherein the plurality of dimensions comprises a plurality of satisfier dimensions and a plurality of motivator dimensions.

14. A computer program product comprising at least one non-transitory computer-readable medium having computer program instructions tangibly stored thereon, wherein the computer program instructions are executable by at least one computer processor to perform a method comprising:
(A) identifying a loyalty level of a first partner in a relationship based on first input provided by the first partner, wherein a loyalty climate model is characterized by the loyalty level, wherein the loyalty climate model characterizes a relationship between the first partner and a second partner in the relationship;
(B) identifying values of a plurality of dimensions of loyalty of the first partner to the second partner in the relationship based on second input provided by the first partner, wherein the loyalty climate model is further characterized by the values of the plurality of dimensions of loyalty;
(C) identifying a loyalty sub-function based on the identified loyalty level, wherein (C) comprises:
(C)(1) performing multivariate regression on the plurality of loyalty scores and the plurality of sets of dimension values to produce a plurality of pairs of coefficients and y-intercepts; and
(C)(2) identifying the loyalty sub-function based on the identified loyalty level and the plurality of pairs of coefficients and y-intercepts;
(D) applying the identified sub-function to the plurality of dimension values to identify a loyalty index associated with the first partner, wherein the loyalty climate model is further characterized by the loyalty index;
(E) identifying a plurality of loyalty scores for a plurality of people; and
(F) identifying a plurality of sets of values of the plurality of dimensions of loyalty, wherein each of the plurality of sets of values corresponds to a distinct one of the plurality of people.

15. The computer program product of claim 14, wherein the plurality of dimensions consists of six dimensions.

16. The computer program product of claim 14, wherein (C) comprises selecting the loyalty sub-function from a set of four loyalty sub-functions.

17. The computer program product of claim 14, wherein the method further comprises:
(G) before (A), providing a survey to a plurality of people, the survey comprising a plurality of questions;
(H) receiving, from the plurality of people, a plurality of sets of answers to the plurality of questions;
(I) identifying a plurality of clusters of the plurality of questions; and
(J) identifying the plurality of dimensions of loyalty based on the identified clusters.

18. The computer program product of claim 14, wherein the method further comprises:
(G) identifying a plurality of loyalty scores for a plurality of people;
(H) applying cluster analysis to the plurality of loyalty scores to identify a plurality of clusters; and
(I) identifying a plurality of breakpoints between the plurality of clusters.

19. The computer program product of claim 14, wherein the plurality of dimensions comprises dimensions of integrity, competency, recognition, proactivity, savvy, and chemistry.

20. The computer program product of claim 14, wherein the plurality of dimensions comprises: (1) at least one satisfier dimension representing at least one pre-requisite that needs to be satisfied in order to maintain the relationship; and (2) at least one motivator dimension representing at least one aspect of the relationship that tends to motivate the first partner and the second partner.

21. The computer program product of claim 20, wherein the plurality of dimensions comprises a plurality of satisfier dimensions and a plurality of motivator dimensions.

* * * * *

UNITED STATES PATENT AND TRADEMARK OFFICE
CERTIFICATE OF CORRECTION

| | | |
|---|---|---|
| PATENT NO. | : 8,121,853 B2 | Page 1 of 1 |
| APPLICATION NO. | : 12/535682 | |
| DATED | : February 21, 2012 | |
| INVENTOR(S) | : Thomas M. Cates | |

It is certified that error appears in the above-identified patent and that said Letters Patent is hereby corrected as shown below:

On the Title Page, in field (56), under (Other Publications), in column 2, lines 5-6, delete "Phycological" and insert -- Psychological --, therefor.

Title Page 2, in column 1, line 1, under "Other Publications", delete "toThe" and insert -- to the --, therefor.

In drawing sheet 11 of 15, figure 11, in Box 1108, line 2, delete "INDENTIFIER" and insert -- IDENTIFIER --, therefor.

In drawing sheet 11 of 15, figure 11, in Box 1112, line 2, delete "INDENTIFIER" and insert -- IDENTIFIER --, therefor.

Signed and Sealed this
Nineteenth Day of June, 2012

David J. Kappos
*Director of the United States Patent and Trademark Office*